United States Patent [19]

Ferrari

[11] Patent Number: 4,778,648

[45] Date of Patent: Oct. 18, 1988

[54] ZIRCONIUM CLADDED PRESSURIZED WATER REACTOR NUCLEAR FUEL ELEMENT

[75] Inventor: Harry M. Ferrari, Edgewood, Pa.

[73] Assignee: Westinghouse Electric Corp., Pittsburgh, Pa.

[21] Appl. No.: 42,190

[22] Filed: Apr. 24, 1987

[51] Int. Cl.⁴ .............................................. G21C 3/06
[52] U.S. Cl. ................................... 376/457; 148/407; 420/422
[58] Field of Search ............... 376/457; 148/407, 421; 420/422

[56] References Cited

U.S. PATENT DOCUMENTS

| | | | |
|---|---|---|---|
| 2,813,073 | 11/1957 | Saller | 376/457 |
| 3,243,350 | 3/1966 | Lustman | 376/457 |
| 3,271,205 | 9/1966 | Winton | 376/457 |
| 3,274,069 | 9/1966 | Alfille | 376/457 |
| 3,287,111 | 11/1966 | Klepfer | 376/457 |
| 4,200,492 | 4/1980 | Armigo et al. | 176/82 |
| 4,372,817 | 2/1983 | Armigo et al. | 376/417 |
| 4,664,881 | 5/1987 | Ferrari | 376/410 |
| 4,675,153 | 6/1987 | Boyle | 376/416 |
| 4,717,434 | 1/1988 | McDonald | 148/407 |

Primary Examiner—Donald P. Walsh

[57] ABSTRACT

A pressurized water reactor nuclear fuel element has a tubular cladding container formed from zirconium or a zirconium alloy material without a protective coating or liner therefor, the cladding material containing less than 4 percent of alloying elements, including an oxygen content of less than 600 parts per million. The cladding contains a sealed nuclear fuel and a pressurized helium atmosphere which fills the gap between the fuel material and the inner wall of the cladding, the helium pressurized to between 150 to 500 pounds per square inch.

11 Claims, 1 Drawing Sheet

ZIRCONIUM CLADDED PRESSURIZED WATER REACTOR NUCLEAR FUEL ELEMENT

FIELD OF THE INVENTION

The present invention relates to an improved nuclear fuel container for use in pressurized water reactors for producing electrical energy from nuclear fission.

BACKGROUND OF THE INVENTION

In producing electrical energy from pressurized water nuclear reactor systems, the reactor provides heat for producing steam that is used to drive a turbine. The fuel elements or rods that are present in the pressurized water nuclear reactor comprise a container or cladding material that contains a nuclear fuel such as uranium dioxide, the fuel being sealed in the container.

While various types of cladding materials for use in forming the container have been proposed, the most prevelant are zirconium based alloys, because of the strength, corrosion resistance and low neutron absorption provided by these alloys under operating conditions.

Designers of such fuel elements have traditionally purposely added small quantities of alloying elements and/or interstitial elements such as oxygen or carbon to zirconium to increase the strength of zirconium-base cladding materials. Typically, specifications in use specify an oxygen content of a zirconium alloy cladding material, such as a Zircaloy, of between about 1000 to 1550 parts per million by weight. In order to achieve such amounts, oxygen must purposely be added to a Zircaloy ingot used in forming cladding.

While the addition of oxygen to the specified range increases the strength of Zircaloy, a desirable property, such oxygen presence also results in a reduction in the resistance of the cladding to pellet-clad interaction failures (PCI). As described in my copending application Ser. No. 919,943, filed Oct. 17, 1986, released fissile materials from the nuclear fuel during operation of a nuclear reactor cause a problem of stress corrosion and possible failure of the metallic tubular cladding. The chemical reaction of the zirconium alloy tubing with the volatile fissile materials, coupled with cladding operating stresses can produce stress corrosion cracking of the zirconium alloy cladding and resultant penetration of the tube wall. To prevent pellet-clad interaction failures, it has been proposed to use a liner tubing on the inside of the cladding, such as a zirconium liner between the fuel pellets and a Zircaloy cladding. Such tubular linings are of the type described in U.S. Pat. No. 4,200,492 and U.S. Pat. No. 4,372,817. U.S. Pat. No. 4,200,492 discloses a nuclear fuel element comprising a zirconium alloy tube with a barrier of sponge zirconium metallurgically bonded to the inside surface of the alloy tube. The sponge zirconium barrier has a thickness of 1 percent ot 30 percent of the thickness of the alloy tube to protect the alloy tube from effects of a nuclear fuel contained therein. The liner of sponge zirconium is said to remain soft during irradiation and to minimize localized strain on the nuclear fuel element, and to protect the alloy tube from stress corrosion cracking or liquid metal embrittlement. The sponge zirconium liner contains 1000 to 5000 ppm of impurities, with the oxygen content of the impurities being about 200 to 1200 ppm. U.S. Pat. No. 4,372,817 is a companion case to U.S. Pat. No. 4,200,492 and discloses a nuclear fuel element similar to that of the earlier patent. The claims require a zirconium alloy tube having constituents other than zirconium in an amount greater than 1000 ppm, while the continuous barrier layer is zirconium metal of impurity content less than 500 ppm, of which the oxygen content is less than about 200 ppm. Such liners are described as barrier layers which are used to protect a zirconium alloy cladding from problems associated with pellet-clad interaction affects.

The use of a high purity low oxygen zirconium liner on the inside of a Zircaloy cladding provides appreciable ductility so that when small cracks are formed on the inner surface of the Zircaloy cladding, as a result of interaction of the cladding with the fuel and fission products, the liner blunts the propagation of the crack to reduce the problems associated with pellet-clad interaction. Such liner tubing is however expensive and results in added cost to a user.

Other approaches to solving the problem of pellet-clad interaction have also been proposed. For example, in copending application Ser. No. 589,390 filed Mar. 14, 1984, now U.S. Pat. No. 4,675,153 in the name of Raymond F. Boyle and assigned to the assignee of the present invention, a composite nuclear fuel rod cladding tube resistant to pellet-clad interaction is described which includes two concentric layers of zirconium base alloys metallurgically bonded to each other. The outer tube comprises a conventional zirconium base alloy having high strength and excellent aqueous corrosion resistance, such as Zircaloy-2 or Zircaloy-4, while the inner layer is a zirconium alloy having about 0.2 to 0.6 weight percent tin, 0.3 to 0.11 weight percent iron, and up to about 350 parts per million oxygen. A fuel element using this composite cladding contains a pressurized inert gas, such as helium, pressurized to about 2 to 5 atmospheres (29.4–73.5 pounds per square inch, psi). Such helium pressurization is primarily for the purpose of providing better heat transfer in the fuel rod.

As another example, in copending application Ser. No. 790,005, filed Oct. 22, 1985 in the names of John P. Foster and George P. Sabol and assigned to the assignee of the present invention, which application is incorporated by reference herein, a cladding tube is described which is composed of a single zirconium base alloy provided preferably with a cold worked and stress relieved microstructure throughout. This cladding has both excellent aqueous corrosion resistance and excellent pellet-clad interaction crack propagation resistance as well as good structural mechanical properties, due to the elemental composition and the presence of no more than 10 volume percent of recrystallized equiaxed grains in the microstructure, with preferably no observable recrystallized grains being present. The impurity content of the zirconium base alloy is less than 1500 parts per million by weight with the oxygen impurity content being less than 600 parts per million, and preferably less than 400 parts per million.

It is an object of the present invention to provide a nuclear fuel element that uses a zirconium or zirconium alloy unitary cladding material, without the need for a liner of coating thereon, or special grain structures, required for the cladding.

SUMMARY OF THE INVENTION

A pressurized water reactor nuclear fuel element has a cladding material of a single layer of a zirconium or zirconium alloy. The zirconium or zirconium alloy must contain less than about 4 percent of alloying materials and have an oxygen content of less than 600 parts per million, by weight. In order to compensate for the loss of strength resulting from the use of such an alloy, the sealed cladding container, containing a nuclear fuel, is pressurized to a pressure of between 150 to 500 pounds per square inch with a helium atmosphere.

DETAILED DESCRIPTION

Figures 1, 2:
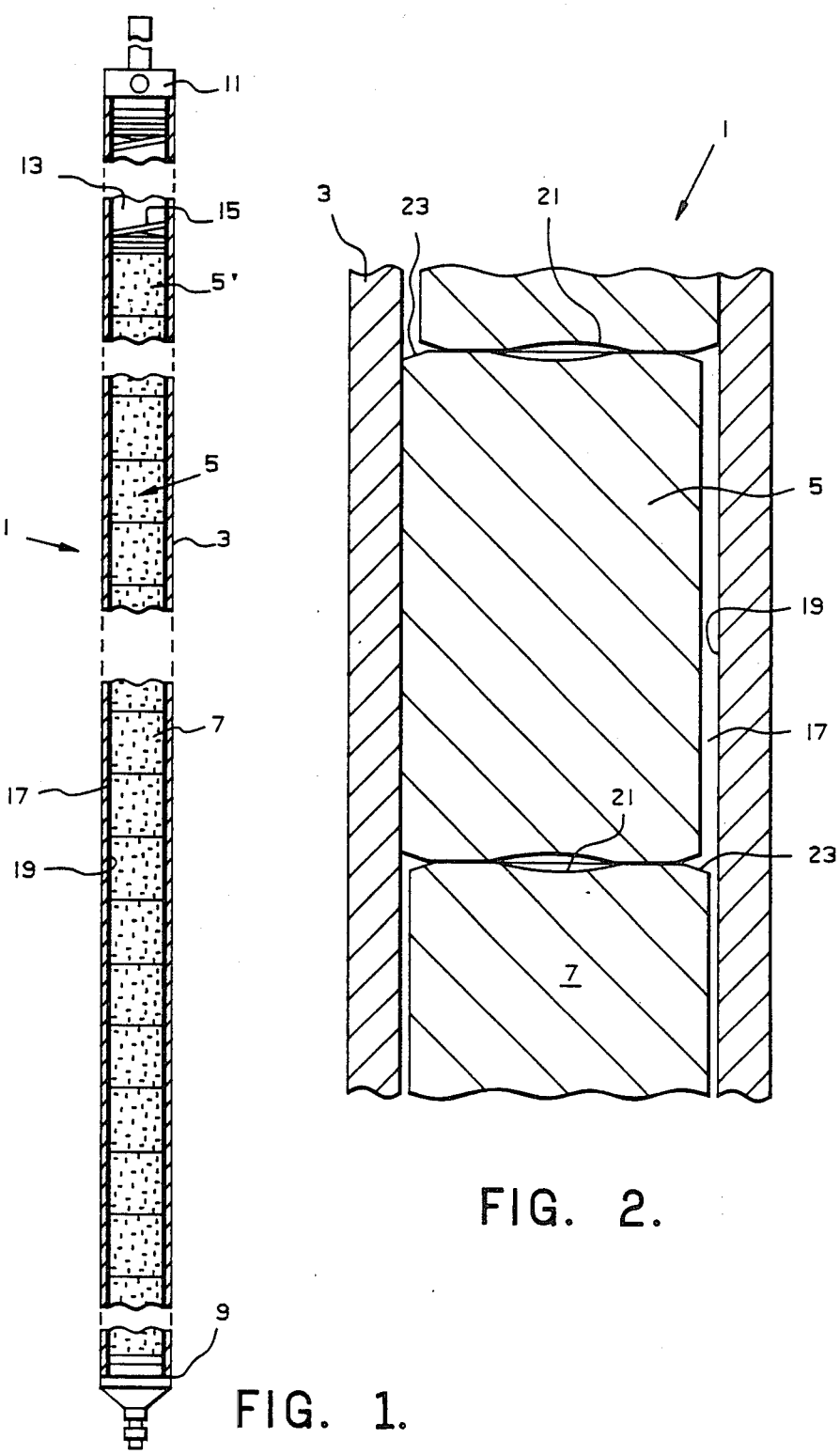
FIG. 1 illustrates a schematic presentation of a partial cross-section through a pressurized water reactor fuel element of the present invention.
FIG. 2 is an enlarged cross-sectional view of the fuel element of FIG. 1 exposing a diametrical, longitudinal plane of the same.

According to the present invention, by recognizing the fact that (1) high ductility is more important than strength in preventing pellet-clad interaction failures, and (2) that loss in strength can be compensated to a significant extent by internally pressurizing the fuel element with helium so as to reduce the effective stress on the clad, the use of a single zirconium cladding material is effective to prevent pellet-clad interaction difficulties normally associated with zirconium alloy cladding. The present invention uses a low oxygen, low alloy zirconium cladding material for a pressurized water reactor fuel element with the loss of strength normally resulting from such a low oxygen content being compensated for by the use of internally pressurized helium gas.

The metallic cladding material used is zirconium or a zirconium alloy containing less than 4 percent by weight of alloying materials, including oxygen, with the oxygen content thereof being less than 600 parts per million by weight. Such zirconium alloys may contain the elements including niobium, tin, iron, chromium, nickel, molybdenum, copper, vanadium and the like and oxygen. Especially useful alloys are a zirconium alloy containing about 1 to 3 percent by weight, and preferably 2.5 percent by weight niobium; and the zirconium alloys containing about 1.2 to 1.7 percent tin, 0.7 to 0.20 percent iron, 0 to 0.8 percent nickel and 0.05 to 0.15 percent chromium. Examples of the latter are alloys known as Zircaloy-2 which contains by weight, about 1.2 to 1.7 percent tin, 0.7 to 0.20 percent iron, 0.05 to 0.15 percent chromium and 0.03 to 0.08 percent nickel, with the balance being zirconium; and Zircaloy-4 which contains, by weight, about 1.2 to 1.7 percent tin, 0.12 to 0.18 percent iron, and 0.05 to 0.15 percent chromium with the balance being zirconium. The oxygen content of the zirconium or zirconium alloy, however, must be below about 600 parts per million, one within the range of 50 to 600 ppm.

The fuel element is formed as a container from the above-described cladding material and contains a sealed supply of nuclear fuel and pressurized helium. The nuclear fuel may comprise uranium dioxide, mixed uranium dioxide-plutonium dioxide, or uranium dioxide enriched in the U-235 isotope, and is generally in the form of disc shaped cylindrical sintered pellets.

As hereinbefore described, the low oxygen content of the zirconium or zirconium alloy cladding material results in a loss of tensile strength of the metal cladding. Such a cladding material having about 1200 ppm oxygen, for example would have a yield strength of about 45,000 pounds per square inch (psi), whereas one with about 600 ppm oxygen would have a yield strength of about 36,000 psi, and one with about 50 ppm oxygen a yield strength of only about 25,000 psi. In accordance with the present invention, however, the decrease in yield strength of the cladding material is offset by using a pressurized helium atmosphere in the sealed metallic container to substantially compensate for such a loss in yield strength. The helium atmosphere sealed in the cladding container must be at a minimum pressure of 150 pounds per square inch (10.2 atmospheres) and a maximum pressure of 500 pounds per square inch (34 atmospheres) at room temperature (20° C.), and is preferably between 200 to 500 psi. During operation of a pressurized water nuclear reactor, the pressure within fuel elements increases about 2.5 times the pressure at ambient, non-operating conditions. Thus, an initial pressure of 150 psi would be sufficient to provide a substitute for the strength of the cladding material resulting from the low oxygen content thereof. A pressure of about 500 psi would increase to about 1250 psi during operation, and higher pressures are to be avoided so as to prevent excessive pressures or rupture of the cladding wall considering the contribution to pressures by the gases generated during the fission reaction.

As an illustration, Table I illustrates the offsetting of the yield strength loss by using a low oxygen content cladding by use of an internal helium pressure. System A represents a conventional unpressurized cladding having a high oxygen content (about 1200 ppm) and a yield strength (hot) of about 45,000 psi, while systems B and C illustrate a cladding having a low oxygen content (about 600 ppm) and a yield strength of about 36,000 psi. The loss of strength is 9,000 psi, or about 20 percent, when the low oxygen content cladding material is used.

TABLE I

| Cladding | Yield Strength hot (psi) | Internal Pressure (psi) | | External Pressure (psi) | ΔP, hot External - Internal |
|---|---|---|---|---|---|
| | | Cold | Hot | | |
| A | 45,000 | 0 | 0 | 2250 | 2250 |
| B | 36,000 | 200 | 500 | 2250 | 1750 |
| C | 36,000 | 500 | 1250 | 2250 | 1000 |

As illustrated, the pressure difference (hot) in A is 2250 psi. In system B, however, using a pressure of 200 psi (cold) the pressure difference (hot) is 500/2250 or about a 22 percent improvement. In system C, using a pressure of 500 psi (cold) the pressure difference (hot) is 1250/2250 or a 55 percent improvement, more than compensating for the loss of yield strength due to the low oxygen content metallic composition of the cladding.

The pressure of the helium within the tubular cladding is thus used to offset the loss of yield strength caused by use of a lower oxygen content cladding material. The internal pressure should be at the higher end of the 150–500 psi range where lower oxygen contents are present in the cladding material, while the internal pressure may be at the lower end of that range where oxygen contents at the higher end of the 50 to 600 ppm range are present. The key is to substantially offset the loss of yield strength of the cladding material, due to the lower oxygen content than conventionally used, by a pressurized helium atmosphere within the fuel element.

A pressurized water reactor nuclear fuel element according to the present invention is illustrated in the accompanying drawings. As shown in FIG. 1, a pressurized water reactor nuclear fuel element 1 comprises a metallic cladding tubular member 3 which contains a nuclear fuel material 5. The nuclear fuel material 5 is generally formed as sintered cylindrical shapes 7 of uranium dioxide or other nuclear fuel and are retained within the cladding tubular member 3 by a bottom end plug 9, formed from zirconium or an alloy of zirconium, which is welded to the cladding and a top end plug 11 also of zirconium or a zirconium alloy also welded to the cladding. Between the uppermost fuel pellet 5' and the top end plug 11 there is provided a void space of plenum 13, with a biasing means such as a spring 15 inserted therein in contact with the top end plug and the uppermost pellet, to restrain the pellets in the cladding.

A clearance space or gap 17 is provided between the nuclear fuel pellets 7 and the internal surface 19 of the cladding material. The clearance space is provided by forming the nuclear fuel pellets 7 with an outer diameter of about 0.008 inch (0.020 cm) less than the inside diameter of the cladding 3. The nuclear fuel cylindrical pellets 7 generally have the ends 21 formed as concavities to minimize relative axial expansion of the center portion of the fuel pellet 7 in use. Also, the ends 23 of each pellet are chamfered, as illustrated in FIG. 2.

Upon placement of the nuclear fuel pellets into the tubular cladding, with the spring 15 in place, the interior of the tube is pressurized with helium gas to a pressure of between 150 to 500 pounds per square inch at ambient temperature, which helium gas is distributed throughout the void spaces or gaps 17 and in the plenum 13, to exert an outward pressure on the inner wall 19 of the tubular cladding 3.

As an indication of the dimensions of the width of such a fuel element, the outer diameter of the cladding 3 would be about 0.419 inch (1.06 cm), with the single wall thickness of the cladding being about 0.022 inch (0.057 cm). This will provide an inner diameter of about 0.374 inch (0.95 cm) that will contain nuclear fuel pellets having a cylindrical shape with a length of about 0.4 to 0.6 inch (1.02 to 1.52 cm), and a length to diameter ratio of less than 1.7:1, and preferably about 1.2:1, with the provisions that the diameter of the pellets will be about 0.0008 inch less than the inner diameter of the cladding so as to leave the gap 17 between the pellets 7 and the inner surface 19 of the cladding.

What is claimed is:

1. A pressurized water reactor nuclear fuel element comprising:
    an elongated sealed tubular cladding container having an inner wall, said container consisting essentially of a cladding material selected from zirconium or a zirconium alloy, said cladding material containing less than four percent by weight of alloying materials including an oxygen content of less than 600 parts per million by weight;
    a nuclear fuel material sealed within said cladding container with a gap provided between said fuel material and said inner wall; and
    a helium gas atmosphere in the gap of said sealed container, said helium gas being pressurized to a pressure of between 150 to 500 pounds per square inch at ambient temperature.

2. A pressurized water reactor nuclear fuel element as defined in claim 1 wherein said cladding material is zirconium metal.

3. A pressurized water reactor nuclear fuel element as defined in claim 1 wherein said cladding material is a zirconium alloy.

4. A pressurized water reactor nuclear fuel element as defined in claim 3 wherein said zirconium alloy contains about 2.5 percent by weight niobium.

5. A pressurized water reactor nuclear fuel element as defined in claim 3 wherein said zirconium alloy containing about 1.2 to 1.7 percent tin, 0.7 to 0.20 percent iron, 0 to 0.8 percent nickel and 0.05 to 0.15 percent chromium.

6. A pressurized water reactor nuclear fuel element as defined in claim 5 wherein said zirconium alloy is Zircaloy-2.

7. A pressurized water reactor nuclear fuel element as defined in claim 5 wherein said zirconium alloy is Zircaloy-4.

8. A pressurized water reactor nuclear fuel element as defined in claim 1 wherein said tubular cladding container has a wall thickness of about 0.022 inch.

9. A pressurized water reactor nuclear fuel element as defined in claim 8 wherein said nuclear fuel is in the form of cylindrical pellets having a length of about 0.4 to 0.6 inch and a length to diameter ratio of about 1.2:1.

10. A pressurized water reactor nuclear fuel element as defined in claim 1 wherein said helium gas is pressurized to a pressure of between 200 to 500 pounds per square inch at ambient temperature.

11. A pressurized water reactor nuclear fuel element comprising:
    an elongated sealed tubular cladding container having an inner wall, said container consisting essentially of a zirconium alloy containing about 1.2 to 1.7 percent tin, 0.7 to 0.20 percent iron, 0 to 0.8 percent nickel and 0.05 to 0.15 percent chromium, with a total of less than four percent by weight of alloying materials present, including an oxygen content of less than 600 parts per million by weight, said cladding container having a wall thickness of about 0.022 inch;
    cylindrical pellets of a nuclear fuel material sealed within said cladding container, said pellets having an outer diameter of about 0.008 inch less than the inside diameter of the tubular cladding container to form a gap between said pellets and said inner wall; and
    a helium gas atmosphere in said gap of said sealed container, said helium gas being pressurized to a pressure of between 150 to 500 pounds per square inch at ambient temperature.

* * * * *